US006803112B1

(12) United States Patent
Chatterjee et al.

(10) Patent No.: US 6,803,112 B1
(45) Date of Patent: Oct. 12, 2004

(54) RADIATION CURABLE AQUEOUS COMPOSITIONS FOR LOW EXTRACTABLE FILM PACKAGING

(75) Inventors: Subhankar Chatterjee, Hampton, NJ (US); Mikhail Laksin, Scotch Plains, NJ (US); David Biro, Branchburg, NJ (US); Jean Dominique Turgis, Rutherford, NJ (US)

(73) Assignee: Sun Chemical Corporation, Fort Lee, NJ (US)

( * ) Notice: Subject to any disclaimer, the term of this patent is extended or adjusted under 35 U.S.C. 154(b) by 0 days.

(21) Appl. No.: 09/538,024

(22) Filed: Mar. 29, 2000

(51) Int. Cl.$^7$ .......................... B32B 15/08; B32B 27/00
(52) U.S. Cl. ...................... 428/458; 428/520; 428/522; 427/496; 427/508; 427/517; 427/519
(58) Field of Search ................................. 428/412, 430, 428/431, 458, 520, 515, 463, 461, 507, 511, 514, 442, 518, 483, 522; 522/84, 71; 427/496, 508, 517, 519

(56) References Cited

U.S. PATENT DOCUMENTS

| | | | |
|---|---|---|---|
| 4,107,013 A | 8/1978 | McGinniss et al. | .... 204/159.16 |
| 4,130,522 A | 12/1978 | McGinniss | ................. 260/29.2 |
| 4,171,387 A | 10/1979 | Fogle et al. | .................... 427/54 |
| 4,269,749 A | 5/1981 | Marriott et al. | ............ 260/29.6 |
| 4,287,039 A | 9/1981 | Buethe et al. | ......... 204/159.19 |
| 4,451,509 A | 5/1984 | Frank et al. | ................ 427/54.1 |
| 4,528,307 A | 7/1985 | Fuhr et al. | ................... 523/440 |
| 4,636,548 A | 1/1987 | Kossmann et al. | ......... 524/524 |
| 4,719,297 A | 1/1988 | Henne et al. | ................ 544/107 |
| 4,782,109 A | 11/1988 | DuLaney et al. | ............ 524/501 |
| 4,861,916 A | 8/1989 | Kohler et al. | ................ 568/337 |
| 5,096,938 A | 3/1992 | Beck et al. | ................... 522/100 |
| 5,168,087 A | * 12/1992 | Li Bassi et al. | ............. 502/164 |
| 5,362,773 A | 11/1994 | Brindoepke et al. | ......... 523/415 |
| 5,387,642 A | 2/1995 | Blum et al. | ................... 524/591 |
| 5,442,090 A | * 8/1995 | Beck et al. | ..................... 560/25 |
| 5,501,942 A | * 3/1996 | Salvin et al. | ............ 430/280.1 |
| 5,548,005 A | 8/1996 | Kurth et al. | ................. 523/414 |
| 5,830,927 A | 11/1998 | Vanderhoff et al. | ........... 522/81 |
| 6,011,078 A | 1/2000 | Reich et al. | ................... 522/86 |
| 6,087,417 A | * 7/2000 | Stevenson et al. | .......... 523/414 |

FOREIGN PATENT DOCUMENTS

| | | |
|---|---|---|
| CA | 2101876 | 2/1994 |
| CA | 2159265 | 3/1996 |
| DE | 3616434 | 11/1987 |
| DE | 252983 | 1/1988 |
| DE | 3740139 | 6/1989 |
| DE | 4114518 | 11/1992 |
| DE | 160660 | 1/1994 |
| EP | 0126341 | 11/1984 |
| EP | 0658 607 | 10/1997 |
| EP | 0799 871 | 10/1997 |
| FR | 2739838 | 4/1997 |
| GB | 1209851 | 10/1970 |
| GB | 1354436 | 2/1972 |
| JP | 52033929 | 3/1977 |
| JP | 55039239 | 3/1980 |
| JP | 1304935 | 12/1989 |
| JP | 05-155952 | 6/1993 |
| WO | WO 81/00569 | 3/1981 |
| WO | WO 9413467 | 6/1994 |
| WO | WO 9919369 | 4/1999 |
| WO | WO 0034400 | 6/2000 |

OTHER PUBLICATIONS

Ellis, Stephen E., Measuring and Controlling Paper Package Odors, Radtech Report, Sep./Oct. 1999, pp. 55–59.

Beck, Erich; Haussling, Lukas, Jager, Ulrich, Reich, Wolfgang, Schwalm, Reinhold; UV Curing with Water Based Materials, Polymeric Materials Science and Engineering, vol. 72, Spring 1995, a.

Starting Formulation 1.7E, Radiation–Curing Raw Materials (Laromer and Lucirin Grades), BASF Corporation Technical Literature, (1997).

Starting Formulation 5.45 b E, Radiation–Curing Raw Materials (Laromer® and Lucirin® Grades), BASF Corporation Technical Literature, (1997).

Starting Formulation 1.13 a E, Radiation–Curing Raw Materials (Laromer® and Lucirin® Grades), BASF Corporation Technical Literature, (1997).

Starting Formulation 1.13 E, Radiation–Curing Raw Materials (Laromer® and Lucirin® Grades), BASF Corporation Technical Literature, (1997).

Starting Formulation 1.9 a U, Radiation–Curing Raw Materials (Laromer® and Lucirin® Grades), BASF Corporation Technical Literature, (1997).

Starting Formulation 1.8 E, Radiation–Curing Raw Materials (Laromer® and Lucirin® Grades), BASF Corporation Technical Literature, (1997).

Material Safety Data Sheet, Product No. 779631, Trade name Laromer® 8765, BASF Corporation, Parsippany, NJ, (Oct. 1990).

Chernyakov, E.A., Savenets, N.I., and Kachan, V.F., Zakhozhai, B. Y., and Shul'ga B.I., Use of Fluorescent Lamps to Intensify the Process of Wood Finishing with Polyester Lacquers, Derevoobrabatyvyushchaya Promshlennost, No. 7, 1979, pp. 6–7.

(List continued on next page.)

Primary Examiner—Monique R. Jackson
(74) Attorney, Agent, or Firm—Sidney Persley

(57) ABSTRACT

A method for producing a low-extractable film packaging from an actinic radiation curable aqueous composition containing a water soluble compound having at least one α, β-ethylenically unsaturated, radiation polymerizable group and water as essential components carried out by applying the aqueous composition to a surface which is then irradiated in a single step with actinic radiation in the presence of the water thereby forming a cured film wherein less than 50 ppb of the water soluble compound or its residual components are extractable by a food simulant.

26 Claims, No Drawings

OTHER PUBLICATIONS

Grumbkova, L.O., Gurova, N.B., Moiseyeva, N.G., and Bogolyuboa, Z.S., Change in the State Standard for Methods of Testing the Fungus Resistance of Paintwork, Lakokrasochnyye Matrialy i Ikh Primeneniye, No. 6, 1987, pp. 64–68.

Schwalm, R., Haubling, L., Reich, W., Beck, E., Enenkel, P., Menzel, K., Tuning the Mechanical Properties of UV Coatings Towards Hard and Flexible Systems, Progress in Organic Coatings, vol. 32, 1997, pp. 191–196.

Padget, J.C., Polymers for Water–Based Coatings—A Systematic Overview, Journal of Coatings Technology, vol. 66, No. 839, Dec. 1994, pp. 89–105.

Hess, Jenn, A Technology of the Future?, Ink World, Jan. 2001, pp. 30–32.

Mercurio Andrew and Flynn Roy, Latex–Based All–Surface Primers, Journal of Coatings Technology, vol. 51, No. 654, Jul. 1979, pp. 45–51.

Belilos, Elliot, Regulatory Implications for UV/EB–Cured Coatings Used in Packaging Children's Products, Radtech Report, Sep./Oct. 1999, pp. 51–59.

Hurd, Patrick, Customer Assurance Solutions for UV/EB in Food Packaging Markets, Radtech Report, Sep./Oct. 1999, pp. 47–50.

* cited by examiner

RADIATION CURABLE AQUEOUS COMPOSITIONS FOR LOW EXTRACTABLE FILM PACKAGING

BACKGROUND OF THE INVENTION

1. Field of the Invention

This invention relates to radiation curable aqueous compositions and printing inks for the manufacture of packaging materials. More particularly, this invention relates to radiation curable compositions and printing inks for the manufacture of low odor food packaging materials which have low levels of extractable components.

2. Description of Related Art

Energy curable, low viscosity inks and coatings are typically composed of mixtures of acrylated oligomers and monomers. Typically monomers are used to control viscosity of ink or coating formulations for flexographic, gravure, roller and tower printing and coating applications. However, diluent monomers do not react completely during polymerization upon exposure to ultraviolet (UV) or electron beam (EB) radiation. Such unreacted monomers remain as residual components in the dried printing ink or coating films and are subject to migration by absorption as well as surface contact. This migration of residual components leads to a host of problems, particularly for printing or coating "odor" and "off-taste" sensitive packaging for packages such as containers for food, beverages, tobacco, perfume, etc., and for such applications which require negligible amounts of extractables from cured printing inks or coatings such as pharmaceutical and health care packaging. In addition, sometimes solvents are employed to achieve a coating of lower viscosity.

An example of a solvent based coating is described in U.S. Pat. No. 5,824,717, Merill et al., which discloses peroxide and radiation (energy) curable compositions containing isobutylene copolymers having acrylate functionality, and optionally a filler. The disclosed copolymers are acrylate modified copolymers of an iso-olefin of 4 to 7 carbon atoms and para-alkylstyrene co-monomers. Merrill discloses that the percentage of extractables from the cured composition is negligible, and that the cured composition is suitable for use in the manufacture of a variety of high purity rubber goods used in the pharmaceutical and health care industries. Merrill further discloses that the compositions may be used as condenser packings, food contact material, wire cable insulation materials, and in the manufacture of high purity hoses. Merrill discloses that coatings are prepared by dissolving the copolymer in toluene as the primary solvent.

Problems resulting from odor, off-taste and residual extractables with currently available UV/EB printing inks and coatings has kept energy curable products at bay from the high volume packaging market, which still is largely served by conventional solvent or water based flexo printing inks and coatings which require the removal of the solvent or water before curing. Acrylated oligomers typically have viscosities, which are too high to be used per se (i.e., without a monomer diluent) for making low viscosity coatings and printing a especially inks.

The use of water as a diluent for mixtures of UV/EB curable acrylated oligomers is disclosed, however, in U.S. Pat. No. 6,011,078 for application in wood and floor coatings. The formulations are dispersions or emulsions, which require prior evaporation or imbition of water on non-absorbent substrates before exposure to light.

There continues to be a need for single fluid, monomer and solvent free UV/EB curable aqueous printing ink and coating formulations, which produce cured films having insignificant odor, off-taste, and/or extractable components.

SUMMARY OF THE INVENTION

The invention is a method for producing a low-extractable film (i.e., printing ink film or coating) comprising the steps of:

(a) providing an actinic radiation curable homogeneous aqueous composition having a water soluble compound which contains at least one alpha, beta-ethylenically unsaturated, radiation polymerizable group; and water; and (b) applying said homogeneous aqueous composition onto a surface; and (c) irradiating the surface with actinic radiation in the presence of water to form a cured film; wherein less than 50 ppb of uncured residue is extractable from the cured film when said film is immersed and heated in 10 ml of a simulant liquid per square inch of cured film.

A further embodiment of this invention is an improved actinic radiation curable homogeneous aqueous composition having a water soluble compound which contains at least one alpha, beta-ethylenically unsaturated, radiation polymerizable group; and water; wherein the improvement comprises the requirement that when a surface is coated with the composition and exposed to actinic radiation in the presence of water, a cured film is formed wherein less than 50 ppb of uncured residue is extractable from the cured film when immersed and heated in 10 ml of a simulant liquid per square inch of cured film, Preferably, the water soluble compound is a water soluble oligomer containing two or more acrylic groups.

A still further embodiment of this invention is a packaging material comprising a substrate and a cured film adhered to the surface of the substrate, wherein: the cured film is derived by providing a homogeneous aqueous composition consisting essentially of a water soluble oligomer containing two or more acrylic groups; and water and curing the homogeneous aqueous composition by actinic radiation in the presence of water such that less than 50 ppb of oligomer residue is extractable from the cured film when it is immersed and heated in 10 ml of a simulant liquid per square inch of cured film.

DETAILED DESCRIPTION OF THE INVENTION

The present invention relates to a novel aqueous radiation curable composition which comprises a water soluble compound which contains at least one $\alpha,\beta$-ethylenically unsaturated, radiation polymerizable group; and water. Preferably, the water soluble compound is a water soluble oligomer containing two or more acrylic groups; and the composition may also contain a photoinitiating system. As used herein the term "low-extractable film" is intended to mean a cured film composition substantially free of solvent extractable oligomer (i.e., less than 50 ppb) or residual components when subjected to solvent under a solvent extraction tests hereinafter described. The curable composition of this invention may also contain a colorant such as a dye or pigment. Such a colored composition may be used as a printing ink in printing operations or simply to form a colored coating. As used herein, the term "printing ink" has its conventional meaning, i.e., a colored liquid composed of a colorant, typically a solid pigment, dispersed in liquid vehicle. In particular the radiation curable printing ink of this invention comprises a pigment and a liquid vehicle. Although the curable composition may be used in a number of applications which require limited extractables, the composition is particularly useful in the packaging industry, and more specifically in the food packaging industry wherein cured coatings and/or printed matter come in contact with food products at ambient and/or processing conditions. Cured compositions of this invention impart substantially no contamination to products contacted by the cured compositions such as foods, drinks, cosmetics, pharmaceuticals, as well as materials used for medical and health care and procedures. In particular, cured compositions of this invention have insignificant or no odor, and impart substantially no off-taste to food products contacted by the cured compositions.

Aqueous Curable Composition

The aqueous radiation curable composition of this invention contains as the essential ingredients, a water soluble compound which contains at least one α, β-ethylenically unsaturated, radiation polymerizable group, preferably a water soluble oligomer containing two or more acrylic groups; water; and optionally a photoinitiating system activatable by actinic radiation such as UV radiation; and/or a colorant such as a dye or pigment.

Water Soluble Compound

As used herein the term "water soluble compound" means a radiation curable compound which contains a limited number of water solubilizing groups, such as carboxyl, hydroxyl, ether and the like, sufficient to provide solutions of the compound in water at ambient temperatures; and in addition which contains at least one α, β-ethylenically unsaturated, radiation polymerizable group. Preferably the water soluble compound is an oligomer. As used herein the term "oligomer" is intended to include compounds which contain two or more terminal, or pendent, α, β-ethylenically unsaturated groups which are linked through a polymeric backbone, or through similar linking groups to a central aliphatic or aromatic backbone. The water soluble compounds used in this invention may be an epoxy acrylate, an epoxy methacrylate, a polyether acrylate, a polyether methacrylate, a polyester acrylate, a polyester methacrylate, a polyurethane acrylate, a polyurethane methacrylate, a melamine acrylate, or a melamine methacrylate. Typically the acrylate is an aromatic or aliphatic acrylate or methacrylate and preferably the compound is a diacrylate ester of an alkanolglycidyl ether such as 1, 4-butanedioldiglycidyl ether, an ethoxylated aromatic epoxide and ethoxylated trimethylolpropanetriacrylate, ethoxylated trimethylolpropanetrimethacrylate, ethoxylated aliphatic or aromatic epoxy acrylate, ethoxylated aliphatic or aromatic epoxy methacrylate, polyoxyethylene glycol. diacrylate; polyoxyethyleneglycol di-methacrylate. Preferably, the ethoxylated aromatic epoxide contains 6 to 20 ethoxy groups.

Suitable water soluble compounds are aliphatic and aromatic epoxy acrylates and epoxy methacrylates, aliphatic compounds preferably being employed. These include, for example, the reaction products of acrylic acid or methacrylic acid with aliphatic glycidyl ethers.

Further suitable compounds are polyether acrylates and methacrylates, polyester acrylates and methacrylates and polyurethane acrylates and methacrylates. Among these, preference is given to the reaction products of acrylic or methacrylic acid with the polyesterols and polyetherols which were described as polycondensates. Particular preference is given to the radiation curable acrylates described in EP-A-126 341 and EP-A-279 303. Polyetherols employed in this context are preferably alkoxylated, especially ethoxylated and/or propoxylated, mono-, di-, tri- or polyfunctional alcohols.

Other suitable compounds are melamine acrylates and methacrylates. These are obtained, for example, by esterifying the free methylol groups of the resins with acrylic acid or methacrylic acid, or by transetherification of etherified melamine compounds with hydroxyalkyl methacrylates, for example hydroxyethyl, hydroxypropyl and hydroxybutyl methacrylate, hydroxybutyl acrylate.

Still further suitable compounds are, in general, thickeners which contain unsaturated groups. These include on the one hand polyurethane thickeners, which contain α,β-ethylenically unsaturated double bonds as a result of the incorporation of the above mentioned hydroxyalkyl methacrylates, hydroxyalkyl acrylates. They also include polyacrylate thickeners, which are obtained by polymer-analogous reaction of, for example, hydroxyl-containing polymers, or polymers containing acid groups, with epoxide-containing methacrylates, acrylates for example glycidyl methacrylate, glycidyl acrylate, or of hydroxyl-containing polymers by esterification with methacrylic acid, acrylic acid or reaction with methacrylic anhydride, acrylic anhydride or by reaction with NCO-terminated methacrylates, methacrylates for example methacryloyl isocyanate, isocyanatoethyl methacrylate, isocyanatoethyl acrylate etc. They additionally include polyvinyl alcohols, which are modified, for example, by reaction with methacrylic anhydride, acrylic anhydride or by esterification with methacrylic acid, acrylic acid with groups containing double bonds. Finally, they include copolymers comprising maleic anhydrideas comonomer, the polymer being modified by ring opening of the anhydride with the above mentioned hydroxyalkyl methacrylates, hydroxyalkyl acrylates or with hydroxy vinyl ethers, for example butanediol monovinyl ether, cyclohexanedimethanol monovinyl ether etc., with double bonds.

Particularly preferred water soluble compounds include diacrylate esters of an alkanolglycidyl ether; wherein the alkanol has 2 or 3 hydroxy groups, such as a diacrylate of 1,4-butanedioldiglycidyl ether; a triacrylate of trimethylolpropane-diglycidyl ether, or a mixture thereof; and ethoxylated acrylic oligomers, such as an ethoxylated trimethylolpropanetriacrylate; an ethoxylated trimethylolpropane diacrylate; or a mixture thereof; wherein the ethoxylated oligomer contains 9–12 ethoxy groups. A particularly preferred water soluble compound is the diacrylate ester of 1,4-butanedioldiglycidyl ether, which is available from BASF Corporation, Charlotte N.C., as Laromer LR 8765 aliphatic epoxy acrylate.

The aqueous, radiation curable coating compositions of this invention contains from about 0.1 to about 95% by weight of the water soluble radiation curable compound, preferably from 75 to 95 wt. %, of the water soluble radiation curable compound made of at least one α,β-ethylenically unsaturated, radiation curable double bond. Preferably, the curable composition contains between about 5 wt. % and about 50 wt. % water. Typically the water soluble compound is added to the coating composition in an amount sufficient to attain a solids content ranging from 75 to 95 wt. %.

Photoinitiating System

Unless the radiation curable composition is formulated specifically for use with electron beam curing, the radiation curable coatings of this invention optionally may contain an addition polymerization photoinitiator which generates free radicals upon irradiation with UV at a wavelength ranging from 200 to 420 nanometers. Thus, the aqueous radiation curable coating compositions of this invention optionally contains from 0 to about 10 wt. of a photoinitiating system. Such a photoinitiating system has one or more compounds that directly furnish free radicals when activated by UV radiation. The photoinitiator system may also contain a sensitizer that extends spectral response into the near ultraviolet, visible and near infrared spectral regions. When cured by UV radiation, the coating compositions typically have from about 0.05 to about 20 wt. %, preferably from 0.05 to 10 wt. % and, in particular, from 0.1 to 5 wt. % of a photoinitiating system. A wide variety of photoinitiating systems may be used provided that the components of the system or their residue after polymerization, are non-migratory or substantially leachable from the cured film. Useful photoinitiators of this type are described by B. M. Monroe and G. C. Weed in an article entitled "*Photoinitiators for Free-Radical-Initiated Photoimaging Systems*", Chem. Rev. 1993, 93, 435–448. Photoinitiators which may be used alone or in combination, include benzophenone, alkylbenzophenones, such as 4-methylbenzophenone, halomethylated benzophenones, Michler's ketone (4,4'-bisdimethylamino-benzophenone), halogenated benzophenones, such as 4-chlorobenzophenone, 4,4'-dichloro-benzophenone, anthraquinone, anthrone (9,10-dihydro-9-anthracenone), benzoin, isobutyl benzoin ether, benzil and benzil derivatives, such as benzil dimethyl ketal, and phosphine oxides or phosphine sulfides, such as bisacylphosphine oxides, 2,4,6-trimethylbenzoyidiphenyl-phosphine oxide, etc. Preferred photoinitiators which may be used alone or in combination with others are 4-(2-hydroxyethoxy)-phenyl-(2-hydroxy-2-methylpropyl)-ketone; isopropyl-thioxanthone; and the like.

If desired the photoinitiating system may additionally comprise a synergist, preferably a tertiary amine. Examples of suitable synergists are triethylamine, dimethylethanolamine, methyldiethanolamine, triethanolamine, amino acrylates, for example amine-modified polyether acrylates, such as the BASF Laromer® grades LR 8956, LR 8889, LR 8869, LR 8894, PO 83F and PO 84F, and mixtures thereof. In the case of pure tertiary amines they are generally employed in an amount of up to 5 wt. %, in the case of amino acrylates in an equivalent amount corresponding to the number of amino groups present, based on the overall amount of the coating compositions.

Colorant

The aqueous radiation curable composition of this invention may additionally contain from 0 to about 50 wt. % of a colorant such as a dye or pigment. Preferably, such dyes or pigments, while soluble or dispersible in the curable composition, form permanent non-migratory components in the coated cured composition. When used as a radiation curable ink, the aqueous coating solution typically contains one or more solid pigments dispersed therein. The pigment may be any conventional organic or inorganic pigment such as zinc sulfide, Pigment White 6, Pigment Yellow 1, Pigment Yellow 3, Pigment Yellow 12, Pigment Yellow 13, Pigment Yellow 14, Pigment Yellow 17, Pigment Yellow 63, Pigment Yellow 65, Pigment Yellow 73, Pigment Yellow 74, Pigment Yellow 75, Pigment Yellow 83, Pigment Yellow 97, Pigment Yellow 98, Pigment Yellow 106, Pigment Yellow 114, Pigment Yellow 121, Pigment Yellow 126, Pigment Yellow 127, Pigment Yellow 136, Pigment Yellow 174, Pigment Yellow 176, Pigment Yellow 188, Pigment Orange 5, Pigment Orange 13, Pigment Orange 16, Pigment Orange 34, Pigment Red 2, Pigment Red 9, Pigment Red 14, Pigment Red 17, Pigment Red 22, Pigment Red 23, Pigment Red 37, Pigment Red 38, Pigment Red 41, Pigment Red 42, Pigment Red 57, Pigment Red 112, Pigment Red 122, Pigment Red 170, Pigment Red 210, Pigment Red 238, Pigment Blue 15, Pigment Blue 15:1, Pigment Blue 15:2, Pigment Blue 15:3, Pigment Blue 15:4, Pigment Green 7, Pigment Green 36, Pigment Violet 19, Pigment Violet 23, Pigment Black 7 and the like. The colorant may also be selected from a dye or pigment certified for use by the Federal Food Drug and Cosmetics Act and include FD&C Red No. 3, D&C Red No. 6, D&C Red No. 7, D&C Red No. 9, D&C Red No. 19, D&C Red No. 21, D&C Red No. 22, D&C Red No. 27, D&C Red No. 28, D&C Red No. 30, D&C Red No. 33, D&C Red No. 34, D&C Red No. 36, FD&C Red No. 40, D&C Orange No. 5, FD&C Yellow No. 5, D&C Yellow No. 6, D&C Yellow No. 10, FD & C Blue No. 1, Iron Oxide Yellow, Iron Oxide Brown, Iron Oxide Red, Iron Oxide Black, Ferric Ammonium Ferrocyanide, Maganese Violet, Ultramarine Blue, Chrome Oxide Green, Hydrated Chrome Oxide Green, Titanium Dioxide. Pigment compositions which are also useful in the energy curable inks of this invention are described in U.S. Pat. Nos. 4,946,508; 4,946,509; 5,024,894; and 5,062,894 each of which is incorporated herein by reference. Such pigment compositions are a blend of the pigment along with a poly(alkylene oxide) grafted pigment. Aqueous curable compositions containing a colorant are particularly useful in formulating radiation curable printing inks for use in conventional printing such as flexographic, gravure letterpress dry-offset and lithographic printing. Although each of these printing operations require printing inks with specific characteristics such as specific viscosity ranges, such characteristics can be realized by adjusting the ratio of solids including the pigment and oligomer, and water.

Other Adjuvants

The aqueous curable compositions may contain additional adjuvants provided that the additional adjuvants do not materially affect the essential nature of the composition and that the adjuvants or their residue after polymerization, are non-migratory and are substantially not leachable from the cured film. Thus the radiation curable compositions and inks of this invention may contain the typical adjuvants to adjust flow, surface tension and gloss of the cured coating or printed ink. Such adjuvants contained in inks or coatings typically are a surface active agent, a wax, fillers, matting agents, or a combination thereof. These adjuvants may function as leveling agents, wetting agents, dispersants, defrothers or deareators, or additional adjuvants may be added to provide a specific function. Preferred adjuvants include fluorocarbon surfactants such as FC-430, a product of the 3M company; silicones, such as DC57, a product of Dow Chemical Corporation; polyethylene wax; polyamide wax; paraffin wax; polytetrafluoro-ethylene wax; and the like.

The coating compositions may contain from about 0 to about 50 wt. %, preferably from about 1 to 50 wt. % of a filler. Examples of suitable fillers are silicates obtainable by hydrolyzing silicon tetrachloride (Aerosil® from Degussa), siliceous earth, talc, aluminum silicates, sodium aluminum silicates magnesium silicates, etc. The coating compositions may also include from 0 to 20 wt. % of protective colloids and/or emulsifiers. Suitable emulsifiers are those commonly employed as dispersants in the context of aqueous emulsion polymerization and known to the skilled worker, such as those described in *Houben-Weyl, Methoden der Organischen Chemie*, Volume XIV/1, Makromoleculare Stoffe, Georg-Thieme-verlag, Stuttgart, 1961, pp. 411–420. Suitable protective materials include polyvinylalcohol, polyvinypyrrolidone, cellulose, cellulose derivatives, starch, starch derivatives, gelatin, gelatin derivatives, etc.

Preparation of Low-Extractable Cured Film

An embodiment of this invention is a method of forming a low-extractable film. In this method, the aqueous composition previously described is applied onto a surface of a substrate and without any substantial removal of water, the applied aqueous composition is irradiated with high energy electrons or UV radiation in the presence of the water to form a cured film. The aqueous composition may be applied to the substrate surface as a uniform coating using any conventional coating technique. Thus the composition may be spin coated, bar coated, roller coated, curtain coated or may be applied by brushing, spraying, etc. Alternatively the aqueous composition may be applied imagewise to the substrate surface, for instance as a printing ink, using any conventional printing technique. Once the aqueous coating composition is applied to the substrate surface, it is immediately cured without any prior removal of the water, using either high energy electrons or UV radiation. Typically the high energy electrons have an energy between 50 and 200 kV electrons and preferably between 85 and 180 kV electrons and are typically produced by high energy electron device. The dosage of high energy electron ranges from about 2 to about 4 megarads (Mrads); and preferably from 2.7 to 3.5 Mrads. UV irradiation may be carried out using any conventional off-contact exposure device which emits within the spectral region from about 200 to about 420 nanometers. The water in the coated composition, even on non-absorbent surfaces, does not interfere with curing process, but rather promotes complete curing of the oligomer into a completely cured film or image with little or no extractable oligomer. Water is believed to be removed concurrently with the curing process and/or subsequently during manipulation of the substrate. As used herein the term "cured film" is intended to include a continuous cured film composition as well as a discontinuous cured ink image composition. In either sense of the term, the cured film is adhered to a substrate and has an outer "cured surface" which defines the surface area used in the extraction protocols fully described hereinbelow.

Substrate

The substrate and its surface may be composed of any typical substrate material such as plastics, for example polystyrene, polyvinylchloride, polynaphthelene terephthalate, polyacrylate, polyacrylic, metals, composites, glass, paper, etc.; and the cured coating on the substrate may be used in a variety of applications where low or no contamination from the substrate is required. Preferably, the substrate is a food packaging material formed of a sheet material, a container such as a bottle or can, or the like. More preferably, the food packaging material is selected from a polyolefin, metalized polyethylene terephthalate, polystrene, polycarbonate, polyurethane, polyesters, polyamide, polyimide or a metal; more preferably a polyethylene, a polypropylene, an aluminum foil or a metal container. Alternatively, the packaging material may be used to contain cosmetics, biological materials such as proteins or specimens, pharmacuticles etc.

Solvent Rub Test

A sample of the cured film is placed on a flat, hard surface with the cured film side up. The cured film surface is then repeatedly rubbed to and from with an applicator pad saturated with a solvent such as methylethylketone, isopropyl alcohol, or the like. The applicator pad typically is a wad of cotton, a soft fabric or a paper product; and is applied under normal hand pressure in a to-and-fro rubbing motion. The number of times the film surface can be rubbed before deterioration of the film surface (e.g., through dissolution, softening, abrasion, or the like) is a measure of the solvent resistance of the cured film. Typically, a cured film is considered solvent resistant if the film can be rubbed 10 or more times with the selected solvent, before any deterioration is observed and preferably 20 to 75 or more times.

Extractable Components

The majority of applications where health safety questions arise relates to plastics films in direct contact applications with food, cosmetics toiletries, medicines, drugs and children's toys. However, the majority of applications are in packaging and, for brevity, we shall use the term "packaging" to comprise all contact situations. Food packaging is by far the biggest application for plastic film packaging. The consumer is anxious about and the plastics merchant responsible for health safety of the packaged food. Many other aspects of food quality are also affected by packaging. Therefore, it is essential to evaluate the sum total of interactive effects to assess the acceptance of the food by the consumer. Processed foods are often formulated (e.g. with additives) or processed (e.g. dehydrated) as to enhance storage life and reduce decay. On the other hand, this mixture of different foods, or comminution, can lead to further reactions. Thus, foods almost invariably change with time usually for the worse. Thus, it is necessary to evaluate the health risk associated with the packaging of foods which have been in contact with plastics films.

To evaluate the scientific basis of health safety, it is necessary to set up a standardized model system which reduces any food packaging situation (or indeed any food contact situation) to its elements. A typical element can be considered as a barrier between food and its environment or any hazard arising from interactions between components. In reality, of course, packages are not uniform, and more than one element type may be involved. Also, there may be scale effects to consider. To better understand the sum effect of the component interactions models are used to integrate up to the whole package.

Components for interaction include: food; plastic film; residual components; additives; volatile components; non-volatile components and environment. Plastics film is defined as the high molecular weight polymer. Additives are the non-polymeric components added subsequently to the manufacture of the original polymer and include processing agents such as heat stabilizers and end use improvers such as UV stabilizers, anti-static agents, etc. Residual components are those traces of raw materials from the plastic film which did not react to form polymer in the original manufacturing process, and were not removed by subsequent purification. These include unreacted monomers (e.g. styrene in polystereyne for example, carpolactam in nylon for example, and VCM in polyvinyl chloride for example), but traces of solvents and unchanged catalysts would also be included. For thermosetting polymers (e.g. polyurethane), however, residual components the basic formulation from which the thermoset has been made would be included. Decomposition products arising at any stage (e.g. acetaldehyde from PEP) can be classified as volatile components, or residual reactants. Environment includes all odorous and non-odorous components which can diffuse into or through the plastic itself. The most important materials concerned war oxygen, water vapor and carbon dioxide; although in certain situations other materials may be significant (e.g.

chlorine form sterilization). Odorous components are those which are capable of changing the taste or smell properties of the food or plastic. Some interactions have purely technological significance and are of no importance. However, some are relevant to health and safety and are listed below:

| Interactions Relevant to Health and Safety | | |
|---|---|---|
| Component | From | To |
| Non-volatile | food | plastics film |
| Volatile | food | environment |
| polymer | plastics film | Food |
| Volatile | plastics film | Food |
| additives | plastics film | Food |

Radiation

Radiation is sometimes applied deliberately to food, film or a filled package for sterilization. Its use for this purpose is largely confined to storage and the packaging of pharmaceutical products. In using radiation, care must be exercised on two counts. First, legislative constraints apply to the limits of radiation that may be used in connection with given foods. Second, intense radiation may lead to degradation of many plastics, especially polyolefins (by chain, scission, crosslinking, oxidation, etc.) and give rise to odor. Advantageous radiation is largely UV (and a certain amount of infra-red) from daylight or fluorescent lamps where the effects on food may be significant; for example, exposure of milk to sunlight for three hours reduces the Vitamin C content and largely destroys the riboflavin content. These effects, and similar ones on other foods, relate to nutrition as opposed to toxicity, and hence the effects on healthy are seldom serious and never acute. In fact, UV radiation has been found to be beneficial due to its sterilizing effects on pathogens.

A transparent film is often required for visibility of the food at point of sale. Where the greatest barrier to radiation is required, this is best achieved not by selecting a particular plastic, but by pigmentation of the plastic. Over 90 percent of all radiation transmission is eliminated by the pigment used to achieve normal coloring of the plastic. Some reduction in UV transmission can also be achieved by incorporating UV absorbers. Some pigments have recently been developed, which are transparent to visible light, but relatively opaque to UV. These may overcome the problem of reducing UV transmission while retaining the desired transparency mentioned above. Of course, radiation exposure can also be reduced or eliminated by thick coatings, printing inks, or using opaque components in laminates, e.g. paper.

Migration

Migration is mass transfer (transport) between plastics and food. It can operate in two ways, from plastic to food (which is the normal meaning) or from food to plastic (termed as "negative migration"). It can have effect on the nutritional quality of food if certain components of the food are lost to a significant extent. The main influence is loss of preservative, but some cases have occurred leading to nutritional quality of food if certain components of the food are lost to a significant extent. The main influence is loss of preservative, but some cases have occurred leading to nutritional or organoleptic changes, e.g. extraction of fat component of milk into polyolefins. If a colorant, for example, is extracted from food, the effect on the food is usually not significant, but the consequential discoloration of the film (staining) is likely to be unattractive.

There is no documented case of any proven health hazard arising from migration to food from plastics film (or indeed any plastic). Most legislation or regulations cover migration and organolepsis. There are three basic types of migration mechanisms: non-migrating; spontaneously migrating; and leaching. Non-migrating migration includes high molecular weight polymer components contacting most foods and some inorganic residues and a few inert (relative to plastics) foods, e.g. dry sugar and salt. Spontaneous migration occurs in the absence of food contact, i.e. the migrant diffuses out, into the environment and the food. Leaching occurs if the plastic is in contact with food or other food simulant (extractant). It is obvious that there must be some physical or chemical action which changes the transport mechanism of the migrant and this can be in two ways: (1) where the migrant has a relatively high diffusion coefficient in the plastic, but is not volatile, wherein as soon as contact is established, the surface layer of migrant is dissolved, and the concentration of extractant in the food increases; and (2) where the food or one of its components, penetrates the plastic to a certain depth and the plastic matrix is substantially changed to the point where mobility of the component within it is increased greatly to the point where the component diffuses out through this layer into the food. The second mechanism is the most difficult of the two to measure in terms of scientific analysis and has only recently become understood. However, it is also the most important, as it is a concern for most additives in plastics contacting most foods.

As mentioned, the "simulant liquid" should ideally be the food to be packaged, and sometimes it can be used. However, severe problems usually arise, namely decomposition of the food making any analysis difficult, non-homogeneous distribution of migrant, and the need to ensure that the film is suitable for a wide range of foods. Therefore, "food simulants" are used instead which are liquids which are convenient for analysis and mimic the action of food. A range of simulants has also been developed, based on two-component mixtures, which may be more realistic. Components of these include tetrahydrofuran, methanol, water and choloform. Commonly used food simulants include:

| Food Type | Most Usual Simulant | Less Usual Simulant |
|---|---|---|
| aqueous | distilled water | mains water |
| acidic | 3% aqueous acetic acid | 2% aqueous acetic acid; citric acid aqueous solution; lactic acid aqueous solution and N/10 hydrochloric acid |
| alkaline | distilled water | aqueous sodium carbonate |
| alcoholic low | 15% aqueous ethanol | 10% aqueous ethanol |
| alcoholic high | 50% aqueous ethanol | |
| fatty | olive oil | n-hexane |
| | HB 307 | n-heptane |
| | | 50% aqueous ethanol |
| | | other vegetable oils, e.g. arachis, sunflower see, groundnut, teaseed, cocoa fat |

Migration tests are typically carried out at normal processing temperatures, the following being typical: sterilization @ 115° C.; boil-in-the bag @ 100° C.; tropical storage @ 38° C.; and normal refrigeration @ 4 or 5° C. Frequently, 40° C. is used in what is assumed to be an accelerated test equivalent to migration at 230° C. for a longer period.

There has been much legislation on the overall or global limit on migration; which may be defined in terms of concentration in food, where 50 to 60 ppm is typical, or migration per unit area. The arguments for the justification of limits are: protection from toxic hazard; protection from adulteration; and a reduction in analytical testing requirements since it would not be necessary to test an extract for health hazard which migrates at a level below the global migration limit.

The methodology oriented to food packaging, would apply with some changes, mostly of emphasis, to the packaging of drugs, medicines, cosmetics and toiletries. The major difference being that toxicity testing is on contact with skin or other body surface, or inhalation in the case of aerosols. Devising a system for regulating plastics films in contact with food, designed to safeguard pubic health, is a complex scientific problem. Both packaging and the use of plastics films have had an explosive growth in the last few decades, and hence relevant regulatory systems have experienced some difficulty keeping up with progress and are continually under review and change. In the United States, for example, packaging materials are within the scope of the Food and Drugs Administration (FDA) of the Department of Health, Education and Welfare. The FDA regulations include an enormous list giving specifications of base polymers and additives. Usage of plastics and their components is permitted in terms of type of food stuff, temperature, application type (e.g. film, molding, or polymeric composition). In many instances, the United States regulations are accepted by foreign countries having no detailed statue or legislation and compliance with them is often required.

Organolepsis

In choosing a food item, a consumer usually decides in principle on a type, e.g. meat or poultry for protein; potatoes, rice or bread for carbohydrate; vegetables; fruit; etc. When choosing which actual product to purchase within the type at the point of sale, however, stated nutritive value or content may have an influence. Yet, the major factors are related to perception through the five major physical senses of sight, hearing, touch, taste and smell. These are called organoleptic effects, and the totality is organolepsis. In packaging they are confined mainly to the sense of smell and taste.

Plastics films contacting food, for example, are not usually required to contribute to the taste or smell of the food. On the contrary, it is usually required that they should not do so. If the taste or smell properties of the food are changed in any way, the result is almost invariably considered unfavorable. If the change is sufficiently unpleasant the result is called "off odor", "off flavor" or "tainting". These have a similar mechanistic rationale to toxic hazard, in that they arise from interactions between the food and plastic or the environment. With rare exceptions, most high molecular weight polymers are tasteless and odorless; thus the majority component of all commercial plastics films will not give rise to an off flavor or off odor of any food. This is a remarkable generalization that can not be made for all packaging materials. Volatiles liable to diffuse from the plastic to the food are divided into those residual from the manufacturing process (hence also including residual reactants); degradation products formed during the conversion process; and additives. As for degradation products formed during the conversion process, these typically arise from polymerization. Some plastics decompose slightly on heating. In a few cases, such as polystyrene and nylon, the main reaction is depolymerization and the by product is monomer or oligomer. In the majority of cases the products are not those which would be obvious.

No mechanical equipment yet exists which can be reliably used for odor or taste testing. Also, although animals can occasionally be used for special cases, they are not suitable for testing of plastics. Consequently, human groups must be used and the human panel members must give an indication of the nature of the off odor or off taste. Although not prima facie essential, it is desirable in selecting individuals for a panel that their sensory reactions are checked against an identified specific stimuli.

Low Extractable Films

Aqueous radiation curable compositions of this invention have the unique characteristic in that a coating of the composition on a surface, when cured with high energy electrons or UV radiation in the presence of the water, forms a cured film from which less than 50 ppb of the water soluble oligomer or residual components are extracted by a simulant liquid under an extraction test such as that described hereinbelow. As used herein the term "simulant liquid" is intended to mean a liquid or solvent which closely simulates a substance which is expected to contact the cured film under conditions its intended use. Thus, for example when the cured film is incorporated into a food packaging material, the simulant liquid should simulate the packaged food during both processing and storage. In this instance the simulant liquid is preferably a "food simulant".

Extraction procedures employing food simulants are described in a publication entitled "*Guidance for Industry Preparation of Premarket Notifications for Food Contact Substances: Chemistry Recommendations*", September 1999, available from the Office of Premarket Approval (OPA), HFS-215, Center for Food Safety & Applied Nutrition (CFSAN), FDA, 200 C. St., S.W., Washington, D.C. 20204. According to FDA procedure, a sample of the cured film is immersed in food simulant (i.e. a solvent or solvent mixture) simulating the food type which would contact the cured film during normal processing, storage and use.

The amount of food simulant used in the extraction is determined from the exposed surface area of the cured film. Thus, for each square inch (6.45 square centimeters) of cured film, 10 ml of food simulant is used in the extraction. Examples of food simulants suitable for use in the present invention include a 10% ethanol/water solution; a 50% ethanol/water solution; a 95% ethanol/water solution; a food oil; a fractionated coconut oil having a boiling range of 240–270° C. and composed of saturated $C_8$ (50–65%) and $C_{10}$ (30–45%) triglycerides; a mixture of synthetic $C_{10}$, $C_{12}$, and $C_{14}$ triglycerides; and the like. In one extraction test, the immersed sample is heated to at least 40° C. for 240 hours. In a more rigorous extraction test, the immersed sample is initially heated to about 121 ° C. for 2 hours then heated to about 40° C. for 238 hours.

When the cured film forms on the inner surface of a container such as a can or beverage bottle, an appropriate amount of food simulant may be added to the container and tested. Typically the cured film is tested using a migration cell in which a specimen of known surface area extracted by a known volume of food simulant. A typical migration cell which may be used is the two-sided migration cell described by Snyder, R. C., and Breder, C. V., in *J. Assoc. Off. Anal. Chem.*, 68 (4), 770–777, 1985. Such a migration cell should incorporate the following features: sample plaques containing the cured film having a known surface area and thickness, are separated by inert spacers, such as glass beads, so that the simulant flows freely around each plaque; the headspace should be minimized, and gas-tight and liquid-tight seals should be maintained, particularly when the migrant is volatile; and the cell should be subjected to mild agitation to minimize any localized solubility limitation that might result in mass-transfer resistance in the food simulant. Any conventional analytical method may be used to determine the quantity of extracted oligomer or residual components present in the food simulant. Thus the nature of the extractives may be determined by suitable chemical or physical tests, such as NMR, UV-visible spectroscopy, atomic absorption spectroscopy, FTIR spectroscopy, mass spectroscopy, gas or liquid chromatography, etc.

In the present invention, the level of extractables is determined using two methods: organoleptic odor test and analytical instrumental methods. It is generally accepted that the residual odor of a cured film can be correlated to residual unreacted material in a coating which migrates in the coating and typically is leachable. This unreacted material also can be extracted and quantified by analytical techniques. Odor is a subjective measurement, but is very important for consumer products where odors are objectionable or are indicative of leachable components which can lead to contamination of foods and drinks and/or to unwanted physiological responses such as allergic reactions, dermatitis, etc.

Residual Odor Test

A coating composition is applied over paper board and aluminum foil with #3 Meyer bar then cured, depending on the composition, with UV light (UV curable compositions) delivering from 120–500 mJ/cm2 of UV energy or cured under electron beam conditions of 3 Mrad with165 kV electrons. Coated and cured paper board and foil samples of equal dimensions are cut up and placed inside of a 1 liter glass jar with a tight "screw on" lid. The jars with samples are placed in oven at 60° C. for 30 min. After this, several people (at least 5) open each jar and rate odor on a 1 to 5 scale where "1" is the lowest odor and "5" is the strongest odor. The average score for each sample is then reported. Residual odor can be related to amount of unreacted material or extractables.

Direct Solvent Extraction

One hundred square centimeters of each cured film is cut into small squares and placed into a 16 ml vial. Ten milliliters of solvent (acetonitrile or methylene chloride) is added and the sample allowed to stand for 24 hours at room temperature. After 24 hours, 3 ml of the solution is removed, filtered through a 0.2 μm polytetrafluoroethylene filter disk, and placed into an auto-sampler vial for analysis. The extracts are then analyzed using high pressure liquid chromatography (HPLC). The mobile phase is 50% water/50% methanol, pumped isocratically at 0.8 ml/min at ambient temperature. The eluent is analyzed using a photodiode array detector (PDA) monitoring at 205 nm. The column is a Phenomenex® LUNA $C_{18}$ column, 4.6 mm×250 mm 5μ particle size with a high pressure limit of 3400 psi.

Back-side Extraction with Food Simulant

The food simulant used (extraction solution) is a water/ethanol solution containing (by volume) 95% ethanol and 5% water. The protocol simulated herein states that 10 grams of food be exposed to one square inch of packaging film. Accordingly, 1 ml of extraction solution is added to a 20 ml vial. The unprinted side of the UV cured film is placed over the vial opening and a Teflon® lined cap is used to seal it. The surface area (opening) for three vials is 1.1 square inches and the weight of fifteen milliliters (3 vials×5 ml) of extraction solution is 11 grams. The inverted vials are placed into an oven and heated at 40° C. for ten days. To increase the detection limit, extraction solutions from twelve vials are combined and evaporated to less than 1 ml then diluted to volume with acetonitrile. This procedure provided a total extraction area of 4.4 square inches. The solution is then analyzed. The concentrated sample is analyzed following the same HPLC method described above for the Direct Extraction method.

The aqueous radiation curable composition of this invention will now be illustrated by the following examples but is not intended to be limited thereby.

EXAMPLE 1

80 parts of an aliphatic epoxy acrylate (Laromer LR8765 from BASF), 19.5 parts of water, and 0.5 parts of an acrylated silicone (Rad 2500 from Tego) were mixed together to produce a stable coating. This composition is applied by wound wire rod to a thickness of 3–6 microns and cured by EB radiation with 3 megarads (Mrads) of 165 kV electrons. The resulting coating has a gloss >70 and complete cure as indicated by the solvent rub test described supra, i.e., more than 30 methyl ethyl ketone (MEK) double rubs.

EXAMPLE 2

77 parts of an aliphatic epoxy acrylate (Laromer LR8765 from BASF), 19.5 parts of water, 3 parts of a photoinitiator (Irgacure 2959 from Ciba) and 0.5 parts of an acrylated silicone (Rad 2500 from Tego) were mixed together to produce a stable coating. This composition is applied by wound wire rod to a thickness of 3–6 microns and cured by UV radiation with at least 120 mJ/cm$^2$. The resulting coating has a gloss >75 and complete cure as indicated by the solvent rub test described supra, i.e., more than 20 MEK double rubs.

EXAMPLE 3

30 parts of a highly ethoxylated trimethylolpropane triacrylate (15 mole EO, SR9035 from Sartomer) and 47 parts of an aliphatic epoxy acrylate (Laromer LR8765 from BASF), 19.5 parts of water, and 0.5 parts of an acrylated silicone (Rad 2100 from Tego) were mixed together to produce a stable coating. This composition is applied by wound wire rod to a thickness of 3–6 microns and cured by EB radiation with 165 kV and 3 Mrads. The resulting coating has a gloss >70 and complete cure as indicated by the solvent rub test described supra, i.e., more than 18 MEK double rubs.

EXAMPLE 4

30 parts of an ethoxylated bisphenol A diacrylate (SR602 from Sartomer), 47 parts of an aliphatic epoxy acrylate (Laromer LR8765 from BASF), 19.5 parts of water, 3 parts of a photoinitiator (Irgacure 2959 from Ciba) and 0.5 parts of an acrylated silicone (Rad 2500 from Tego) were mixed together to produce a stable coating. This composition is applied by wound wire rod to a thickness of 3–6 microns and cured by UV radiation with at least 120 mJ/cm$^2$. The resulting coating has a gloss >82 and complete cure as indicated by the solvent rub test described supra, i.e., more than 40 MEK double rubs.

EXAMPLE 5

70 parts of a glycerol-based polyether acrylate (Laromer 8982 from BASF), 10 parts of an epoxy acrylate (91–275 from Reichhold), 15 parts of water, 3 parts of a photoinitiator (Irgacure 2959 from Ciba) and 2 parts of a silicone (L-7602 from Witco) were mixed together to produce a stable coating. This composition is applied by wound wire rod to a thickness of 3–6 microns and cured by UV radiation with at least 120 mJ/cm$^2$. The resulting coating has a gloss >90 and complete cure as indicated by the solvent rub test described supra, i.e., more than 15 MEK double rubs.

EXAMPLE 6

This example demonstrates a red printing ink formulated according to this invention. 40 parts of a red colorant aqueous dispersion (Sunsperse RHD6012 from Sun Chemical Pigments Division), 50 parts of an aliphatic epoxy acrylate (Laromer LR8765 from BASF), 5 parts of water, 5parts of a photoinitiator (Irgacure 2959 from Ciba) were mixed together and applied with a flexo hand proofer (300 lines per inch anilox) to a thickness of 1–2 microns and cured by UV radiation with at least 250 mJ/cm$^2$. The resulting ink is completely cured as indicated by the solvent rub test described supra, i.e., more than 10 IPA double rubs.

EXAMPLE 7

This example demonstrates a blue printing ink formulated according to this invention. 30 parts of pigment blue 15:3 (Phthalocyanine blue from SunChemical) and 70 parts of a highly ethoxylated trimethylolpropane triacrylate (15 mole EO, SR9035 from Sartomer) were ground on a three roll mill to form a concentrated base with a grind of 2/0; 20 parts of this base was mixed with 40parts of a polyethylene glycol (400) diacrylate (SR 344 from Sartomer), 10 parts of a photoinitiator (Irgacure 2959 from Ciba), 10 parts of highly ethoxylated trimethylolpropane triacrylate (15 mole EO , SR9035 from Sartomer) and 40 parts of water to form a blue ink which was applied with a flexo hand proofer (300 lines per inch anilox) to a thickness of 1–2 microns and cured by UV radiation with at least 250 mJ/cm$^2$. The resulting ink is completely cured as indicated by the solvent rub test described supra, i.e., more than 12 IPA double rubs.

EXAMPLE 8

The residual odor of the electron beam cured aqueous composition of Example 1 was compared to an electron beam cured conventional composition (Composition B) using the "Residual Odor Test" described above.

Composition B: 30 parts of an ethoxylated trimethoylpropane triacrylate (Photomer 4149 from Cognis), 30 parts of tripropyleneglycol diacrylate (TRPGDA from UCB Radcure), 30 parts epoxy acrylate (Epotuf 91–275 from Reichhold), 7.5 parts of a benzoate plasticizer (Benzoflex 9–88 from Velsicol), 1 part of a polyoxypropylene sterate (Prolam MR-216 from Lambent Technologies), 2 part of a polydimethylsilicone (L7602 from Witco), 1 part of a silicone (DC-57 from Dow Coming) and 0.5 parts of a wax compound (Bareco wax compound from Carroll Scientific) are thoroughly mixed together to get a stable coating composition.

As described above in the "Residual Odor Test" protocol, each coating composition was applied over a paper board and an aluminum foil by wound wire rod to a thickness of 3–6 microns and cured by EB radiation with 3 Mrads of 165 kV electrons. As described in the protocol the odor of the samples were rated and the results are disclosed in the following Table:

TABLE 1

| Composition | Odor on paper | Odor on Aluminum foil |
| --- | --- | --- |
| Example 1 | 1.8 | 1.3 |
| Conventional (Composition B) | 3.4 | 3.3 |

EXAMPLE 9

The residual odor and total extractables of the electron beam cured aqueous composition of Example 1 was compared to an electron beam cured conventional composition (Composition C) using the "Residual Odor Test" protocol and the Direct Extraction Protocol described above.

Composition C: 40 parts of an ethoxylated trimethoylpropane triacrylate (EOTMPTA, Photomer 4149 from Cognis), 26 parts of tripropyleneglycol diacrylate (TRPGDA, from UCB Radcure), 25 parts epoxy acrylate (Epotuf 91–275 from Reichhold ), 6.3 parts of a benzoate plasticizer (Benzoflex 9–88 from Velsicol), 0.7 part of a polyoxypropylene sterate (Prolam MR-216 from Lambent Technologies) and 2 part of a polydimethylsilicone (L7602 from Witco) are thoroughly mixed together to get a stable coating composition.

As described above in the "Residual Odor Test" protocol, each coating composition was applied over an aluminum foil by wound wire rod to a thickness of 3–6 microns and cured by EB radiation with 3 Mrads of 165 kV electrons. As described in the "Residual Odor Test" protocol the odor of the samples were rated. The residual extractables in each of the coated and cured compositions was determined as described in the "Direct Solvent Extraction" protocol in which the solvent is methylene chloride. The results of each test are disclosed in the following Table:

TABLE 2

| Composition | Total Extractables (ppb) | Odor on Board |
| --- | --- | --- |
| Example 1 | <50 | 2.1 |
| Conventional (Composition C) | 3000 EOTMPTA 1800 TPGDA | 3.0 |

EXAMPLE 10

The residual extractables of a UV cured aqueous composition of this invention (Composition D) was compared to a UV cured conventional composition (Composition E) using the "Backside Extraction with Food Simulant" protocol described above in which the solvent is methylene chloride.

Composition D: 77 parts of an aliphatic epoxy acrylate (Laromer LR8765 from BASF), 19.5 parts of water and 3 parts of a photoinitiator (KIP 150 from Lamberti) were mixed together to produce a stable coating solution.

Composition E: 30 parts of a trimethoylpropane triacrylate (TMPTA, Photomer 4006 from Cognis), 25 parts of tripropyleneglycol diacrylate (TRPGDA from UCB Radcure), 24 parts epoxy acrylate (Epotuf 91–275 from Reichhold), 7.0 parts benzophenone photoinitiator (from Velsicol), 1.0 parts of a dimethyl-benzyl ketal photoinitiator (Irgacure 651 from Ciba), 3.0 parts of triethanolamine (from ChemCentral), 8.0 parts of an acrylated amine (Laromer 8956 from BASF) and 2 parts of a silicone (DC57 from Dow Corning) are thoroughly mixed together to get a stable coating composition.

Each coating composition was applied to paperboard. By wound wire rod to a thickness of 3–6 microns and cured by UV radiaton with a dose of 150 mJ/cm$^2$. The residual extractables in each of the coated and cured compositions was determined as described in the "Backside Extraction" protocol. The results for each coating composition are disclosed in the following Table:

TABLE 3

| Coating Composition | Backside Extractables |
|---|---|
| Example 10 | <50 ppb Laromer 8765 |
|  | <50 ppb KIP 150 |
| Conventional | 500 ppb TPGDA |
| (Composition E) | 400 ppb TMPTA |
|  | 1700 ppb Benzophenone |
|  | 100 ppb Irgacure 651 |

EXAMPLE 11

The residual extractables of EB cured aqueous composition of Example 1 of this invention was compared to EB cured conventional composition (Composition B) using the "Backside Extraction with Food Simulant" protocol described above. Each coating composition was applied to polyolefin by a wound wire rod to a thickness of 3–6 microns and cured by EB radiation with a dose of 3 Mrads at 165 KeV. The residual extractables in each of the coated and cured compositions was determined as described in the "Backside Extraction" protocol. The results for each coating composition are disclosed in the following Table:

TABLE 4

| Coating Composition | Backside Extractables (ppb) |
|---|---|
| Example 1 | <50 ppb Laromer 8765 |
| Conventional | 125 TMPTA |
| (Composition B) | 95 TPGDA |

EXAMPLE 12

70 parts polyethylene glycol 200 diacrylate (SR259 from Sartomer), 29.5 parts of water and 0.5 part of a silicone (DC57 from Dow) were mixed together to produce a stable coating. This composition was applied by wound wire rod to a thickness of 3–6 microns and cured by EB radiation with 165 kV electrons and 3 Mrads. The resulting coating had a gloss of 80 and was completely cured as indicated by a solvent rub test (>25 MEK double rubs).

EXAMPLE 13

82 parts of polyethyelene glycol 400 diacrylate (SR344 from Sartomer), 14 parts of water, 3 parts of a photoinitiator (irgacure 2959 from Ciba) and 1.0 part of an acrylated silicone (Ebercyl 350 from UCB Radcure) were mixed together to produce a stable coating. This composition was applied by wound wire rod to a thickness of 3–6 microns and cured by UV radiation with at least 180 mJ/cm$^2$. The resulting coating had a gloss of 75 and cured completely as indicated by a solvent rub test (>20 MEK double rubs).

Those skilled in the art having the benefit of the teachings of the present invention as hereinabove set forth, can effect numerous modifications thereto. These modifications are to be construed as being encompassed within the scope of the present invention as set forth in the appended claims.

What is claimed is:

1. A method for producing a low-extractable film comprising the steps of:
    (a) providing an actinic radiation curable homogeneous aqueous composition having
        (i) a water soluble compound which contains at least one, -ethylenically unsaturated, radiation polymerizable group and
        (ii) water;
    (b) applying said aqueous composition onto a surface; and
    (c) irradiating the surface with actinic radiation in the presence of the water; thereby forming a cured film wherein less than 50 ppb of uncured residue is extractable from the cured film when immersed and heated in 10 ml of a simulant liquid per square inch of cured film.

2. The method of claim 1 wherein the water soluble compound is an oligomer.

3. The method of claim 2 wherein the oligomer is an acrylate.

4. The method of claim 3 wherein the acrylate is selected from the group consisting of a epoxy acrylate, a epoxy methacrylate, a polyether acrylate, a polyether methacrylate, a polyester acrylate, a polyester methacrylate, a polyurethane acrylate, a polyurethane methacrylate, a melamine acrylate, a melamine methacrylate, a polyethylene glycol diacrylate and a polyethylene glycol dimethacrylate.

5. The method of claim 4 wherein the acrylate is an aromatic or aliphatic acrylate.

6. The method of claim 4 wherein the acrylate is a diacrylate ester of an alkanolglycidyl ether or an ethoxylated aromatic epoxide or a polyethylene glycol diacrylate.

7. The method of claim 6 wherein the diacrylate ester of an alkanolglycidyl ether is 1,4-butanedioldiglycidyl ether or the diacrylate ester is an exthoxylated aromatic epoxide.

8. The method of claim 6 wherein the ethoxylated aromatic epoxide contains 6 to 20 ethoxy groups.

9. The method of claim 8 wherein water is present in an amount ranging from about 5 weight % to about 25 weight %, based on the weight of the aqueous composition.

10. The method of claim 8 wherein the composition has a viscosity between 10 and 100,000 centipoises.

11. The method of claim 1 wherein the irradiating is carried out with high energy electrons.

12. The method of claim 1 wherein the composition further comprises a photoinitiating system activatable by UV radiation.

13. The method of claim 12 wherein the irradiating is carried out with UV radiation.

14. The method of claim 1 wherein the surface is selected from the group consisting of a polyolefin, a polyethylene terephthalate, a metalized polyethylene terephthalate, polycarbonate, cellulosic material, paper material, cardboard material, metal, glass, polystrene, polyvinylchloride, polynaphthelene terephthalate, polyacrylate and polyacrylic.

15. The method of claim 14 wherein the surface is a food packaging material.

16. The method of claim 15 wherein the food packaging material is a container or a sheet material.

17. The method of claim 16 wherein the food packaging material is the polyolefin, the metalized polyethylene terephthalate, the polyethylene terephthlate, or the metal.

18. The method of claim 17 wherein the polyolefin is a polyethylene or polypropylene.

19. The method of claim 17 wherein the metal is aluminum foil or steel.

20. The method of claim 15 wherein the simulant liquid is a food simulant.

21. The method of claim 20 wherein the food simulant is selected from the group consisting of a 10% ethanol/water solution; a 50% ethanol/water solution; a 95% ethanol/water solution; a food oil; a fractionated coconut oil having a boiling range of 240–270 C and composed of saturated $C_8$ (50–65%) and $C_{10}$ (30–45%) triglycerides; and a mixture of synthetic $C_{10}$, $C_{12}$, and $C_{14}$ triglycerides.

22. The method of claim 14 wherein the simulant liquid is methylene chloride.

23. The method of claim 20 wherein the heating is at least 40 C for at least 240 hours.

24. The method of claim 20 wherein the heating is initially at least about 121 C for 2 hours and then about 40 C for 238 hours.

25. A packaging material comprising a substrate and a cured film adhered to the substrate surface derived by providing a homogeneous aqueous composition consisting essentially of (a) a water soluble oligomer containing two or more acrylic groups and (b) water; applying the homogeneous aqueous composition on the substrate; and curing by actinic radiation in the presence of the water, such that less than 50 ppb of oligomer residue is extractable from the cured film when immersed and heated in 10 ml of a simulant liquid per square inch of the cured film.

26. The packaging material of claim 25 wherein the packing material is a food packaging material and the simulant liquid is a food simulant.

* * * * *